United States Patent [19]

Tuttle

[11] 3,707,874
[45] Jan. 2, 1973

[54] SOLID STATE POSITION SENSING APPARATUS

[75] Inventor: Wainwright Tuttle, Cincinnati, Ohio

[73] Assignee: Spati Industries, Inc., Covington, Ky.

[22] Filed: March 24, 1971

[21] Appl. No.: 127,515

[52] U.S. Cl. .............................. 73/398 R, 73/339 R
[51] Int. Cl. ................................................ G01l 9/02
[58] Field of Search .................. 73/398 R, 399, 339 R

[56] References Cited

UNITED STATES PATENTS 3,416,373   12/1968   Havens ............................. 73/339 R
3,504,543   4/1970    Cutting ......................... 73/339 R X
3,590,638   7/1971    Anastasia ......................... 73/398 R

*Primary Examiner*—Louis R. Prince
*Assistant Examiner*—Frederick Shoon
*Attorney*—Melville, Strasser, Foster & Hoffman

[57] ABSTRACT

Device including a temperature sensitive, self-heated impedance means and a spaced apart solid means. Any condition between the impedance means and the solid object which affects the heat transfer therebetween may be sensed by measuring the electrical resistance of the impedance means.

7 Claims, 4 Drawing Figures

PATENTED JAN 2 1973  3,707,874

INVENTOR/S
WAINWRIGHT TUTTLE

BY *Melville, Strasser, Foster and Hoffman*
ATTORNEYS

SOLID STATE POSITION SENSING APPARATUS

BACKGROUND OF THE INVENTION

This invention relates to a solid state semiconductor whose electrical resistance changes with temperature, and to the use of such a semiconductor in a sensing apparatus. The type of semiconductor shown in the embodiment is often called a thermistor, which by definition is an electrical element whose resistance varies sharply and in a known manner in accordance with changes in temperature. When such an element is in proximity to a solid mass at a different temperature, the rate of transfer of heat between them depends upon a number of factors, including the distance between them, the size and shape of the surfaces, the finish of the surfaces, the mass and specific heat of the solid, the thermal conductivity of the solid and their supports, the composition of the environment of the thermistor, relative movement between the gas environment and the thermistor, and the volume and distribution of the gas space. Since the temperature of the thermistor depends upon its rate of heat loss or gain, any of the foregoing factors or combinations may be measured by determining the resistance of the thermistor while holding the other factors constant.

Normally, the rate of change of resistance or response time is made as short as possible to permit rapid reading of a new condition of dynamic equilibrium in comparison with the previous condition; the transient, changing resistance being generally of less interest. The condition of dynamic equilibrium is with a constant temperature difference. Conveniently, this difference is produced by heating the thermistor with electrical energy in the form of a constant current passing through the constant resistance of the thermistor at the constant temperature produced when the total heat energy dissipation equals the total electrical energy converted to heat.

Thermistors and similar devices have been employed to indicate or measure fluid flow and fluid composition, liquid gas interface contact, and related phenomena by measuring the resistance change resulting from heat dissipation changes caused by variations in the phenomenon to be measured.

The instant invention improves and extends the usefulness of a heated thermistor sensing system by incorporating a solid mass adjacent to the thermistor so that the heat dissipation depends upon the conditions of the solid, and also greatly increases the effect on the thermistor of a change in the condition of the gas in the vicinity.

This arrangement is extremely sensitive to a change in position of the thermistor with respect to the solid mass, particularly the spacing between them. It is an object of this invention to provide a method of determining the position or a change of position of a solid mass closely adjacent to a heated thermistor, with extreme accuracy. This arrangement must also provide great stability and relative freedom from uncontrolled variables in a simple and reliable manner. A further object of the invention is to provide a method whereby the conditions or change of conditions of a gas between the thermistor and the closely adjacent solid mass may be sensed with great sensitivity and accuracy in a simple and reliable manner. This includes gas or vapor pressure, flow, composition, and any other factor which affects the heat conductivity of the gas.

Still another object of the invention is the provision of an extremely sensitive but stable system for sensing the position or change of position of a closely adjacent solid mass which is moved by, and hence measures, any property whose measurement can be achieved by having the property move or position the solid object. This includes fluid volumetric change, pressure, acceleration, force and any other factor which can be arranged to affect the position of the solid object.

Still another object of the invention is the provision of a sensor which can be readily compensated for any change in ambient conditions.

Still a further object of the invention is to provide a sensor which will produce an electrical signal which can be processed for any desired type of analog or digital readout or control.

SUMMARY OF THE INVENTION

In its broadest terms, the instant invention contemplates simply the provision of a heated thermistor and a spaced apart solid mass. The electrical circuitry which supplies energy to heat the thermistor will include components for detecting and/or indicating a change in electrical resistance of the thermistor caused by a change in its temperature.

The sensor may desirably include two heated thermistors, only one of which is closely adjacent a solid mass. A condition of dynamic equilibrium is created wherein the temperature and hence the circuit resistance of the two thermistors is identical for any given set of starting circumstances. The electrical circuitry is arranged to detect an imbalance in the electrical resistance of the thermistors; hence changes in ambient conditions which effect them equally will be disregarded.

DESCRIPTION OF THE PREFERRED EMBODIMENT

U.S. Letters Pat. No. 3,544,745 issued on Dec. 1, 1970, in the name of Wainwright Tuttle and titled "Sensor," teaches a unit adapted to sense very small changes in fluid pressure or quantity. The instant invention, in its preferred embodiment, represents an improvement on the structure shown in that patent.

By way of very brief review, U.S. Pat. No. 3,544,745 teaches a sensor including a housing structure having an internal chamber. This chamber communicates on one side with a fluid system including the article or system to be tested, and on the other side with a reference fluid system. Within the chamber, the two foregoing fluid systems are separated by a very thin, lightweight resilient member of relatively small effective area.

According to that invention, changes in pressure or volume in the fluid system to be tested would cause movement of the resilient member separating the two systems.

That patent further taught that a first electrical contact was provided within the chamber, and a second contact was provided on the resilient member, so that a movement of the resilient member sufficient to bring the electrical contacts together would trigger a suitable system indicating a change in fluid pressure or quantity.

Figure 1:
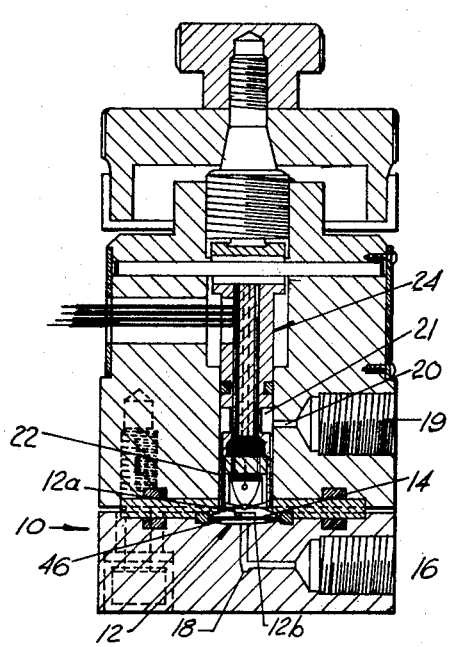
FIG. 1 is a cross sectional view of a sensing apparatus according to this invention.

FIG. 1 of this application is similar to FIG. 1 of the aforementioned patent. The primary difference being that the apparatus of this invention includes a novel probe or central stem assembly. Changes in pressure or volume of the fluid system to be tested are sensed by the circuitry to be described, which does not depend upon the bringing together of electrical contacts. The device of this invention is far more effective in detecting extremely small changes in fluid pressure or quantity when embodied in the structure shown in FIG. 1.

With specific reference to the drawing, the sensor includes a housing indicated generally at 10. Within the housing is the chamber 12 which is in effect divided into the upper chamber 12a and the lower chamber 12b by the diaphragm 14.

The lower chamber 12b is in communication via the port 16 and passage 18 with a known or reference fluid system. The upper portion of the chamber 12a is in communication with a fluid system in which changes in pressure or volume are to be detected. This communication may be effected via the port 19, passage 20, the groove 21 in the central stem 24, and the passages 22, one of which is seen in FIG. 1. The passages 22 are conveniently formed by, for example, a series of "flats" on the central stem 24 extending from the groove 21 to the lower end of the stem.

Figure 3:
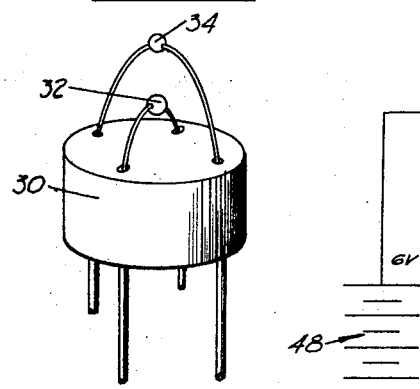
FIG. 3 is a perspective view of the probe subassembly of the structure shown in FIG. 1.

Reference is made to FIG. 3 of U.S. Pat. No. 3,544,745 for a schematic diagram illustrating the use of the sensor of this invention in connection with a leak testing system. In such a system, a fluid reference system charged to a known pressure and quantity communicates via the port 16 and passage 18 with the lower portion of the chamber 12b, while a second fluid system including the article is to be tested for a leak communicates with the upper portion of the chamber 12a via the port 19 and the passages indicated above.

It will thus be apparent that any leak in the fluid system to be tested will result in a reduction in fluid quantity and pressure of the fluid system communicating with the upper portion of the chamber 12a. This is in turn will permit an upward biasing of the diaphragm 14.

The central stem of the sensor of this invention is indicated generally at 24. In accordance with the teachings of U.S. Pat. No. 3,544,745, the central stem is adjustably mounted within the housing 10, so that the initial position of the lower end of the probe can be accurately positioned.

Figure 2:
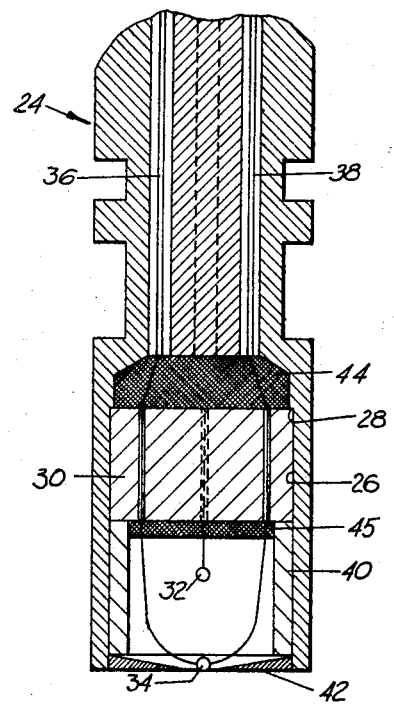
FIG. 2 is an enlarged cross sectional view of the lower portion of the stem or probe assembly.

Referring now to FIG. 2 which is an enlarged cross sectional view of the lower portion of the stem 24, it will be seen that the lower end of the stem is provided with a counterbore 26 having a locating shoulder 28. Received within the counterbore and against the locating shoulder 28 is the insulated sleeve or holder 30 seen in perspective in FIG. 3. The holder 30 serves to mount the thermistors 32 and 34. To this end, it is provided with four equally spaced holes, two of which receive the lead wires from the compensating thermistor 32, while the other two receive the lead wires from the sensing thermistor 34. These lead wires extend all the way through the holder 30, and into the space above the locating shoulder 28.

The stem 24 is provided with four longitudinal passages aligned generally with the openings in the holder 30. Two of these passages are shown in FIG. 2 at 36 and 38. The four leads from the thermistors 32 and 34 are connected to the electrical circuit to be described hereinafter by means of insulated wires passing through the passages in the stem.

Disposed within the counterbore 26 just below the holder 30 is the spacing collar 40. When the holder 30 containing the mounted thermistors 32 and 34 is placed in the counterbore 26, and the spacing collar 40 is placed in position, the end of the counterbore 26 is in part covered with the protective or shield member 42. It will be observed that the shield is provided with a central opening, and is tapered so that the thickness at the center is as thin as possible.

In the embodiment shown, an epoxy seal is cast in place in the portion of the counterbore above the locating shoulder 28 as shown at 44. The epoxy also bonds the holder, the spacing collar, the leads, the shield, and the stem into a mechanically strong and leak proof assembly. A seal 45 may also be cast in place within the collar 40 over the lower end of the holder 30.

Referring now to FIG. 1, it will be observed that the diaphragm 14 carries at its center the small plate 46 of low mass. This plate may be of any suitable material which is relatively highly heat radiative and convective for low thermal lag. Preferably the plate 46 will be relatively rigid to prevent entry of the diaphragm into the space containing the thermistors under large unbalanced pressures to prevent damage.

As explained at the outset of this application, a thermistor is an electrical element whose resistance varies sharply and in a known manner with temperature. When the two thermistors 32 and 34 are heated by a constant electric current, the resistance of the thermistors will vary with the heat loss. It will be apparent that the two thermistors 32 and 34, in the arrangement just described are each subjected to the same fluid environment. However, the thermistor 34, due to its close proximity to the plate 46 carried by the diaphragm, will have a greater rate of heat loss. More importantly, its rate of heat loss will be greatly affected by any change in the relative spacing between the thermistor 34 and the metallic plate 46. Any other factor which would affect heat loss would also affect thermistor 32. Therefore, the arrangement just described in conjunction with the electrical circuit to be explained hereinafter is effective to sense repeatably and accurately any variation in the space between the thermistor 34 and the plate 46.

Figure 4:
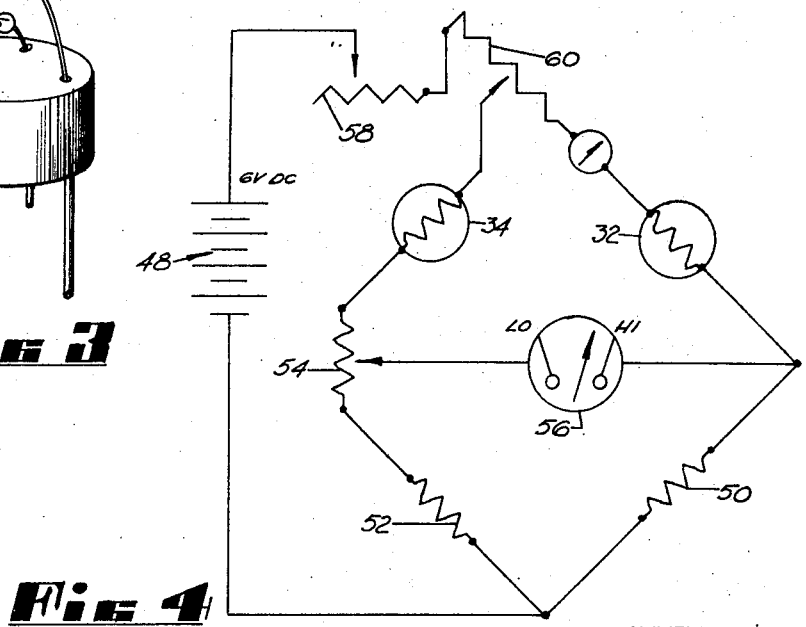
FIG. 4 is an electrical schematic diagram showing an exemplary circuit for the sensor of this invention.

Turning now to FIG. 4, an electrical circuit of the Wheatstone bridge type is illustrated. A suitable source of stable electric current such as the battery 48 is utilized to heat the thermistors 32 and 34. In the embodiment shown, the right hand leg of the Wheatstone bridge circuit includes the series connected thermistor 32 and the fixed resistor 50. The left hand leg of the circuit includes the thermistor 34 and the fixed resistor 52. It may also include the variable resistor 54, the tap of which is connected across the bridge circuit with the microammeter meter relay 56 which, as well known in the art, will indicate any imbalance in the resistance of the two legs of the circuit.

It will be observed that one of the power leads from the battery 48 is connected to the tap of the variable resistor 58. This variable resistance enables accurate control of the temperature of the compensating thermistor 32. The variable resistor 58 will be set to heat the thermistor 32 to any desired temperature. The variable resistor 58 is connected in series to the variable resistor 60, the tap of which is connected to the left leg of the Wheatstone bridge circuit. By adjusting the position of the tap on the variable resistor 60, the initial balance may be set to achieve the condition of dynamic equilibrium referred to earlier. That is, the greater heat loss of the sensing thermistor 34 requires a different current to achieve the necessary resistance balance at the starting proximity to the metallic plate 46. Adjustments to the variable resistor 54 permit fine adjustment to bring the two legs of the circuit into balance.

It is believed that operation of this circuit should be clear to the skilled worker in the art. By adjusting the variable resistor 58, the starting temperature and hence starting resistance of the compensating thermistor 32 can be set. By setting the variable resistor 60, the starting temperature of the sensing thermistor can be brought into balance creating a condition of dynamic equilibrium. Any movement of the metallic plate 46 toward or away from the sensing thermistor 34 will, as is known in the art, vary the heat loss from the sensing thermistor 34, and hence vary its resistance. Any imbalance between the two legs of the circuit may be utilized via the microammeter meter relay 56 to trigger an appropriate indicator.

It should also be apparent to the skilled worker in the art that while the embodiment disclosed contemplates proximity sensing, many other types of sensing can readily be carried out. Specifically, any factor which would affect the rate of heat transfer between the heated thermistor and the adjacent solid mass may be sensed. This would include fluid composition, which would of course affect fluid conductivity, and the like.

While the embodiment disclosed includes two thermistors, one for sensing purposes and a second for compensating purposes, the simplest case would involve the use of a single thermistor in close proximity to a solid mass. This would eliminate the necessity for the Wheatstone bridge type circuit described earlier, as variations in resistance of the thermistor could be measured by ordinary means.

Accordingly, no limitations on this invention are intended except as specifically set forth in the claims which follow.

The embodiments of the invention in which an exclusive property or privilege is claimed are defined as follows:

1. Sensing apparatus comprising:
   a. a temperature responsive impedance means;
   b. electric circuit means for supplying an initial constant current to said impedance means to heat said impedance means;
   c. a resilient diaphragm;
   d. a solid mass carried by said diaphragm and located in spaced proximity to said impedance means whereby to create a dynamic equilibrium in which the total heat energy dissipation from said impedance means is substantially equal to the total electrical energy supplied to said impedance means converted to heat, and whereby movement of said solid mass will affect the rate of heat dissipation from said impedance means; and
   e. means operatively associated with said electrical circuit means for indicating a change in electrical resistance of said impedance means.

2. The apparatus claimed in claim 1 including a second temperature responsive impedance means operatively associated with said electrical circuit means whereby to heat said second temperature responsive impedance means, said second impedance means being disposed remote from said first impedance means and from said solid mass.

3. The apparatus claimed in claim 2 wherein both said temperature responsive impedance means and said electric circuit means for heating both said impedance means are connected in a circuit of the Wheatstone Bridge type.

4. Sensing apparatus comprising:
   a. a pair of spaced apart temperature responsive impedance means;
   b. a solid mass located in spaced proximity to one of said impedance means;
   c. electric circuit means including said pair of impedance means in a Wheatstone bridge for heating said pair of impedance means; and
   d. means operatively associated with said electric circuit for indicating an unequal change in resistance of said impedance means, whereby to sense a condition affecting the rate of heat dissipation of said one of said impedance means different from the other.

5. The apparatus claimed in claim 4 wherein the resistance of one leg of said Wheatstone bridge electrical circuit is variable, whereby to create a dynamic equilibrium compensating for the greater heat loss of said one impedance means.

6. In apparatus for sensing very small changes in fluid pressure or quantity including a chamber communicating on one side with a fluid system at a fixed pressure or quantity and on the other side with a fluid system in which a change is to be detected, a thin, resilient member disposed in said chamber and effective to separate said fluid systems; the improved structure comprising:
   a. a first electric element whose resistance varies with temperature disposed in said portion of said chamber communicating with said fluid system in which a change is to be detected;
   b. a solid mass carried by said resilient member and disposed adjacent said first electric element;
   c. a second electric element whose resistance varies with temperature, said second element being disposed in the same portion of said chamber as said first electric element and spaced from said first electric element and differently spaced than said first electric element from said solid mass so as to have a different heat transfer relationship therewith;
   d. electric circuit means for supplying a constant current to heat said first and second electric elements; and e. means operatively associated with said electric circuit means for indicating a change in resistance of said first electric element whereby to sense relative movement between said first electric element and said solid mass.

7. The apparatus claimed in claim 6 wherein said first and second electric elements and said means for heating said elements are connected in a circuit of the Wheatstone bridge type.

* * * * *